United States Patent [19]

Neu et al.

[11] Patent Number: 5,180,759

[45] Date of Patent: * Jan. 19, 1993

[54] EXOTHERMIC COMPOSITIONS

[75] Inventors: Max G. Neu, Lichfield; Michael J. Gough, Gnosall, both of United Kingdom

[73] Assignee: Foseco International Limited, Birmingham, England

[*] Notice: The portion of the term of this patent subsequent to Aug. 30, 2005 has been disclaimed.

[21] Appl. No.: 185,997

[22] Filed: Apr. 25, 1988

Related U.S. Application Data

[62] Division of Ser. No. 35,458, Apr. 7, 1987.

[30] Foreign Application Priority Data

May 1, 1986 [GB] United Kingdom ............... 8610739

[51] Int. Cl.$^5$ .......................... C21D 7/00; C21D 3/18
[52] U.S. Cl. .................................. 523/141; 523/143; 524/430; 524/433
[58] Field of Search ............... 523/141, 143, 430, 433

[56] References Cited

U.S. PATENT DOCUMENTS

| | | | |
|---|---|---|---|
| 3,635,877 | 1/1972 | Van Wyk | 523/145 |
| 4,031,046 | 6/1977 | Tisza | 523/141 |

FOREIGN PATENT DOCUMENTS

| | | | |
|---|---|---|---|
| 681547 | 3/1964 | Canada | 524/546 |
| 627678 | 10/1949 | United Kingdom . | |

*Primary Examiner*—Joseph L. Schofer
*Assistant Examiner*—Peter D. Mulcahy
*Attorney, Agent, or Firm*—Nixon & Vanderhye

[57] ABSTRACT

An exothermic composition comprises a particulate readily oxidizable metal such as aluminum, magnesium or silicon and an organic fluorine-containing compound, and usually an oxidizing agent for the readily oxidizable metal. The preferred organic fluorine-containing compound is polytetrafluoroethylene. The composition may also contain a binder, a particulate refractory material, refractory fibres and/or organic fibres. The composition may be used in the casting of molten metal, either in particulate form or as a preformed shape such as a sleeve or board, to cover or surround molten metal in the feeder of a casting mould or in the head or head box of an ingot mould.

14 Claims, No Drawings

EXOTHERMIC COMPOSITIONS

This is a division of application Ser. No. 035,458, filed Apr. 7, 1987.

This invention relates to exothermic compositions, and particularly to exothermic compositions used in the casting of molten metals.

When molten metal is cast into a mould and allowed to solidify the metal shrinks during solidification and its volume is reduced. In order to compensate for this shrinkage and to ensure that sound castings are produced it is usually necessary to employ so-called feeders located above and/or at the side of castings. When the casting solidifies and shrinks molten metal is fed from the feeder(s) into the casting and prevents the formation of shrinkage cavities. In order to improve the feeding effect and to enable the feeder volume to be reduced to a minimum it is common practice to surround the feeder cavity and hence the feeder itself with an exothermic or exothermic and heat-insulating composition which retains the feeder metal in the molten state for as long as possible.

For the same reason it is also common practice in the casting of ingots, for example steel ingots, to line the head of an ingot mould or a head box fitted to an ingot mould with an exothermic composition or an exothermic and heat-insulating composition.

In both applications the exothermic or exothermic and heat-insulating compositions are commonly used in the form of preformed shapes such as cylindrical sleeves for lining the feeders of foundry casting moulds and boards for the lining of ingot mould heads or head boxes.

Exothermic or exothermic and heat-insulating compositions are also used, either as preformed boards, or in particulate form, for example as powders or granules (known as anti-piping compounds), to cover the surface of molten metal in a casting mould feeder or in an ingot mould or the head box of an ingot mould.

The exothermic compositions employed in the applications described above usually consist essentially of a metal which is readily capable of oxidation, usually aluminium, and an oxidising agent therefore, for example iron oxide, sodium nitrate or manganese dioxide. The composition will usually contain a particulate refractory filler, and when used as a preformed shape, a binder. Preformed shapes which are to be heat-insulating as well as exothermic will usually contain a fibrous material and/or a light-weight particulate refractory material.

In order to improve the sensitivity of the exothermic composition, i.e. reduce the time lag between applying to the composition a temperature at which it will ignite and the actual ignition of the composition, it was proposed some years ago to include in the composition a proportion of an inorganic fluoride salt. Examples of inorganic fluoride salts which may be used for this purpose include simple fluorides such as sodium fluoride, potassium fluoride, lithium fluoride or magnesium fluoride, and complex fluorides such as sodium silicofluoride, potassium silicofluoride, sodium aluminium fluoride or potassium aluminium fluoride. Exothermic compositions containing inorganic fluoride salts are described in British Patents 627678, 774491, 889484 and 939541.

Although it has become universally accepted that a fluoride salt must be present, from environmental considerations the presence of fluoride salts in exothermic compositions is undesirable. It is therefore preferred that the fluorine content of the compositions is held at as low a level as possible commensurate with a satisfactory sensitivity.

It has now been found that an organic fluorine-containing compound can be used advantageously at reduced levels compared with an inorganic fluoride salt in such exothermic compositions.

According therefore to the present invention there is provided an exothermic composition comprising a particulate readily oxidisable metal and an organic fluorine-containing compound.

The readily oxidisable metal may be for example aluminium, magnesium or silicon, or an alloy containing a major proportion of one or more of these metals. Aluminium or an aluminium alloy is preferred.

The organic fluorine-containing compound may be a fluorocarbon polymer such as polytetrafluoroethylene or polyhexafluoropropylene, a polymer containing fluorine and chlorine such as polychlorofluoroethylene, or polyvinyl fluoride.

Polytetrafluorothethylene in particulate form is preferred. The polytetrafluoroethylene may be used for example as particles of the pure compound or as particles of polytetrafluoroethylene filled with a material such as fibreglass or carbon.

The quantity of organic fluorine-containing compound used in the composition will usually be from 0.05% to 10.0% by weight, more usually from 0.1% to 6.0% by weight.

Although it is possible to produce exothermic compositions which rely on oxygen in the atmosphere as the source of the oxygen required to react with the readily oxidisable metal to produce heat the composition will usually also contain an oxidising agent for the metal.

When used the oxidising agent may be for example iron oxide, manganese dioxide, sodium nitrate, potassium nitrate, sodium chlorate or potassium chlorate. Two or more oxidising agents may be used in combination if desired.

The composition will usually contain one or more other components depending on whether the composition is to be used as a preformed shape or in particulate form, and on whether it is desired that the composition should have heat-insulating as well as exothermic properties.

If the exothermic composition is to be used in the form of a preformed shape such as a sleeve or board the composition will also contain one or more binders. Examples of suitable binders include resins such as phenol-formaldehyde resin or urea-formaldehyde resin, gums such as gum arabic, sulphite lye, starch or colloidal silica derived from colloidal silica sol.

Compositions which are to be used in particulate form and compositions which are to be used as preformed shapes may contain a particulate refractory material such as silica sand, alumina or an aluminosilicate such as grog or chamotte.

In order to improve the heat-insulating properties of the composition after completion of the exothermic reaction at least a proportion of the particulate refractory material may be a lightweight material of density less than about 0.5 $g/cm^3$ such as perlite, diatomite or calcined rice husks, and/or the composition may contain refractory fibres such as aluminosilicate fibres or calcium silicate fibres, and/or organic fibres.

The compositions of the invention will usually contain by weight:

| | |
|---|---|
| readily oxidisable metal | 10-30% |
| oxidising agent | 0-20% |
| organic fluorine-containing compound | 0.1-6% |
| particulate refractory material | 5-80% |
| refractory fibre | 1-55% |
| organic fibre | 0-8% |
| binder | 0-25% |

Weight for weight solid organic fluorine-containing compounds are more efficient than inorganic fluoride salts in improving the sensitivity of an exothermic composition.

The following example in which prior art compositions are compared with compositions according to the invention will serve to illustrate the invention:

A series of six sleeves was prepared from a basic composition consisting of aluminium powder and foil particles as oxidisable metal, manganese dioxide as oxidising agent, particulate alumina, aluminosilicate fibres and paper, and phenol-formaldehyde resin and colloidal silica sol as binders. Four of the sleeves contained inorganic fluoride salts and two sleeves contained polytetrafluoroethylene.

The sensitivity of the exothermic composition of each of the sleeves was determined by placing the sleeve on a plate heated to 1400° C. and measuring the time taken for ignition to commence.

The identity and amounts of the flourine-containing compounds used and the results which were obtained are tabulated below:

| | FLOURINE-CONTAINING COMPOUND | % BY WEIGHT | SENSITIVITY (SECS) |
|---|---|---|---|
| 1 | Sodium aluminum fluoride (min. 93% purity) | 3.0 | 30 |
| | Potassium aluminium fluoride | 1.0 | |
| 2 | Sodium silicofluoride | 4.0 | 43 |
| 3 | Sodium aluminium fluoride (min. 60% purity) | 4.0 | 54 |
| 4 | Magnesium fluoride | 4.0 | 53 |
| 5 | Polytetrafluorethylene | 4.0 | 11 |
| 6 | Polytetrafluorethylene | 1.5 | 25 |

We claim:

1. An exothermic composition comprising by weight, 10-30% of a particulate readily oxidizable metal; an oxidizing agent for the metal in an amount of up to 20%; 0.05-10% of an organic fluorine-containing compound selected from the group consisting of polytetrafluoroethylene, polyhexafluoropropylene, polychlorofluoroethylene and polyvinylfluoride; 5-80% of a particulate refractory material; 1-55% of a refractory fiber; and a binder in an amount of up to 25%.

2. An exothermic composition according to claim 1 wherein the readily oxidisable metal is aluminium, magnesium or silicon.

3. An exothermic composition according to claim 1 wherein the readily oxidisable metal is an alloy containing a major proportion of aluminium, magnesium or silicon.

4. An exothermic composition according to claim 1 wherein the oxidising agent is one or more of iron oxide, manganese dioxide, sodium nitrate, potassium nitrate, sodium chlorate or potassium chlorate.

5. An exothermic composition according to claim 1 including a binder which is one or more of phenol-formaldehyde resin, urea-formaldehyde resin, gum arabic, sulphite lye, starch or colloidal silica derived from colloidal silica sol.

6. An exothermic composition according to claim 1 wherein the particulate refractory material is silica sand, alumina or an aluminosilicate.

7. An exothermic composition according to claim 1 in which at least a proportion of the particulate refractory material is a lightweight material of density less than 0.5 g/cm$^3$.

8. An exothermic composition according to claim 7 wherein the lightweight particulate refractory material is perlite, diaomite or calcined rice husks.

9. An exothermic composition according to claim 1 including refractory fibres which are aluminosilicate fibres or calcium silicate fibres.

10. An exothermic composition according to claim 1 and containing organic fibres.

11. An exothermic composition according to claim 10 wherein the organic fibres are paper.

12. An exothermic composition according to claim 10 wherein the quantity of organic fibres present is up to 8% by weight of the composition.

13. An exothermic composition according to claim 1 containing 0.1-6% by weight organic fluorine-containing compound.

14. A preformed shape for lining parts of molds used in the casting of molten metals and formed of an exothermic composition according to claim 1.

* * * * *